United States Patent
Dezonno et al.

(10) Patent No.: US 6,181,366 B1
(45) Date of Patent: *Jan. 30, 2001

(54) VIDEO SWITCHING SYSTEM, VIDEO COMMUNICATIONS SYSTEM AND METHOD FOR ESTABLISHING VIDEO COMMUNICATIONS WITH A TELEPHONIC SWITCH

(75) Inventors: Anthony J. Dezonno, Downers Grove; Paul E. Van Berkum, Winfield, both of IL (US)

(73) Assignee: Rockwell International Corp., Costa Mesa, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/581,482

(22) Filed: Dec. 20, 1995

(51) Int. Cl.[7] .................................................. H04M 11/00
(52) U.S. Cl. ................................ 348/16; 348/14; 379/265
(58) Field of Search ................................ 379/202, 93.14, 379/265, 266, 142, 93.21; 348/14–17; 370/384, 385; 235/379, 380

(56) References Cited

U.S. PATENT DOCUMENTS

| | | | |
|---|---|---|---|
| 4,989,233 | * 1/1991 | Schakowsky et al. | 379/142 |
| 5,042,062 | * 8/1991 | Lee et al. | 370/384 |
| 5,563,937 | * 10/1996 | Bruno et al. | 348/14 |
| 5,654,961 | * 8/1997 | Araujo et al. | 348/15 |
| 5,661,283 | * 8/1997 | Gallacher et al. | 235/379 |

* cited by examiner

Primary Examiner—Stella Woo
(74) Attorney, Agent, or Firm—Welsh & Katz, Ltd.; James A. Scheer; Jon P. Christensen

(57) ABSTRACT

A video communications system 100, a video switching system 108 and method are provided for establishing video communications with a video communications device 104 utilizing the agent selection and reporting features of an automatic call distributor (ACD) 102. The ACD 102 receives an initial request from the video communications device 104 and rejects the initial request. A computer system 112 detects the initial request and acquires destination information in the initial request identifying the video communications device 104. The computer system 112 sends a simulated call to the ACD 102 requesting an agent for video communications. The ACD 102 selects an agent and notifies the computer system 112 which agent is selected. The computer system 112 then instructs an agent terminal 110 associated with the selected agent to establish video communications with the video communications device 104. The ACD 102 generates reports relating to the video communications.

14 Claims, 1 Drawing Sheet

VIDEO SWITCHING SYSTEM, VIDEO COMMUNICATIONS SYSTEM AND METHOD FOR ESTABLISHING VIDEO COMMUNICATIONS WITH A TELEPHONIC SWITCH

BACKGROUND OF THE INVENTION

The present invention is related to a system for establishing video communications between a video communications device and a remote agent and, more particularly, to a video switching system, video communications system and method for establishing video communications between a video communications device and a remote agent wherein a telephonic switch selects which remote agent is to receive the video communications and provides reporting capabilities relating to the video communications.

Telephonic switches are increasingly being used by businesses to automatically route incoming customer calls to available agents. One common type of telephonic switch is an automatic call distributor (ACD) which generally includes a multiport switch controlled by a central processing unit to interconnect external telephonic units of an external telephonic network with internal telephonic units. An example of such an ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

One feature of numerous telephonic switches is the ability to intelligently select which agents receive certain incoming telephone calls. This selection process may be based on information provided by the caller, the skills of the individual agents, automatic number identification (ANI) information, dialed number identification service (DNIS) information or other information. Complex software routines stored in the telephonic switch use this information to properly route calls.

Another advantageous feature is the ability of telephonic switches to acquire, process and report information concerning different aspects of switch activity. Typically, a data display terminal generates visual representations of the information. Based on this information, management and supervisory personnel are able to evaluate the call activity within the switch and, if necessary, make changes for more efficient switch operation.

Telephonic switches further provide for predictive outdialing wherein the switch automatically calls an individual at a certain time and telephone number. When the individual answers the outdialed call, the switch connects the individual to a selected agent.

Video communications devices are increasingly being used to transmit video images between two locations. Such devices permit individuals to talk to each other while concomitantly viewing the other party. These devices are particularly attractive in businesses having security concerns, such as banks and the like.

Current telephonic switches are unfortunately unable to handle video communications. Consequently, the above features, such as intelligent agent selection, extensive reporting capability and outbound dialing, are not available for video communications through a conventional telephonic switch.

Accordingly, there is a need for an improved video switching system which utilizes these features of a telephonic switch by having the telephonic switch intelligently select an agent to receive the video communications and generate reports relating to the video communications.

SUMMARY OF THE INVENTION

This need is met by a video switching system, video communications system and method in accordance with the present invention wherein a telephonic switch selects an agent to receive video communications from a video communications device. A computer system prompts an agent terminal associated with the selected agent to establish video communications. During the video communications, the telephonic switch logs the video communications for later reports.

In accordance with one aspect of the present invention, a video switching system establishes video communications with a video communications device. A computer system detects when a telephonic switch receives an initial request to establish video communications from the video communications device. In response to detecting the initial request, the computer system generates a video request signal which is received by an agent terminal associated with an agent. The agent terminal then establishes video communications with the video communications device based on the video request signal. Preferably, the telephonic switch selects which agent is to establish video communications and generates reports relating to the video communications.

In accordance with another aspect of the present invention, a video communications system establishes video communications with a video communications device. The system comprises a telephonic switch for receiving an initial request to establish video communications and a video switching system for establishing video communications based on the initial request. The telephonic switch being capable of routing audio communications to selected ones of a plurality of agents.

Preferably, the video switching system comprises a computer system for detecting receipt of the initial request by the telephonic switch and for prompting an agent terminal to establish video communications. The telephonic switch preferably selects which agent is to receive the video communications and/or generates reports relating to the video communications.

In accordance with yet another aspect of the present invention, a method is provided for establishing video communications with a video communications device. the method comprises the steps of: receiving at a telephonic switch an initial request that the video communications device wishes to establish video communications; detecting when the telephonic switch receives the initial request; and establishing video communications with the video communications device based on the initial request.

Preferably, the method comprises the step of rejecting the initial request by the telephonic switch, and the step of detecting when the telephonic switch receives the initial request comprises the step of detecting when the telephonic switch rejects the initial request. It is further preferred that the method comprise the step of prompting the telephonic switch to select one of a plurality of agents to receive the video communications and the step of establishing video communications with the video communications device comprises the step of establishing video communications between the video communications device and the selected one of the agents.

These and other features and advantages of the present invention will become apparent from the following detailed description, the accompanying drawings and the appended claims.

DETAILED DESCRIPTION OF THE INVENTION

Figure 1:
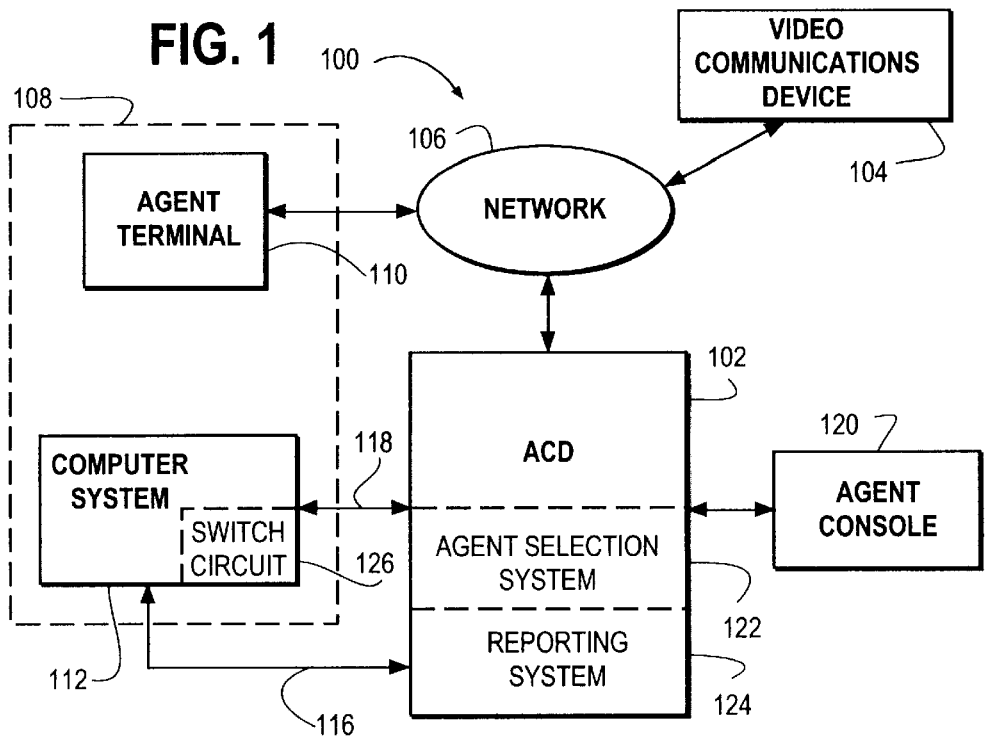
FIG. 1 is a block diagram of a video communications system utilizing a telephonic switch to establish video communications in accordance with the present invention.
Figure 2:
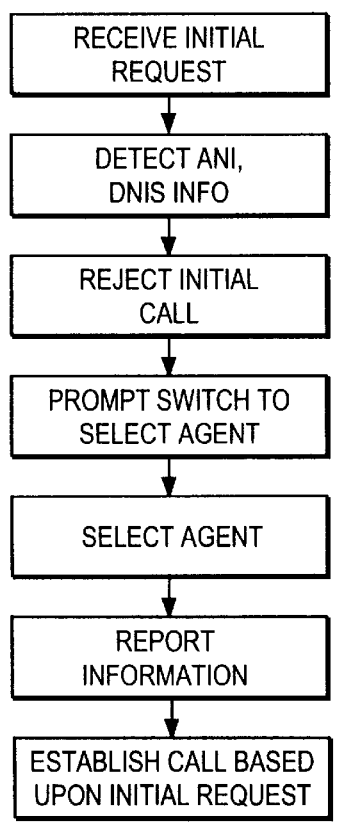
FIG. 2 is a flow chart illustrating a method of establishing video communications in accordance with one aspect of the present invention.

A video communications system 100 which employs a telephonic switch, such as an automatic call distributor (ACD) 102, to establish video communications with a video communications device 104, which is commonly known as a KIOSK, in accordance with the present invention is shown in FIG. 1. The video communications are established over a conventional network 106. The structure and philosophy of networks for transmitting video communications are well known and, as such, will not be further described herein.

A video switching system 108 establishes video communications between an agent terminal 110 and the video communications device 104, via the network 106. A computer system 112 receives information from the ACD 102, prompts the agent terminal 110 to establish communications with the video communications device 104 and provides information to the ACD 102 regarding the video communications. The computer system 112 includes a switch circuit 126 for communicating with the ACD 102. The communications between the ACD 102 and the computer system 112 can be performed over a dedicated T1 line 116 or any other connecting line 118.

In a typical call switching system, the ACD 102 transfers a call to an agent console 120 based on which agent is located at the agent console 120. Although the ACD 102 is typically connected to more than one agent console 120, only one agent console is shown for ease of description. Current call switching systems have further eliminated the agent console 120 having the call directly routed to the agent terminal 110 associated with an agent. Agent consoles 120 are well known and will not be further discussed. Moreover, the present invention may be advantageously employed in call switching systems both with and without agent consoles.

The ACD 102 further includes an agent selection system 122 for selecting an available agent to receive a call. Methods for selecting an agent to receive a call based on ANI information, DNIS information, agent skills and the like are well known. A reporting system 124 generates reports detailing switch operation and provides these reports to an appropriate display device, such as an electronic display or printer.

The present invention provides a system and method for establishing video communications between the agent terminal 110 and the video communications device 104 which utilizes the agent selection and reporting features of the ACD 102. In operation, an individual at the video communications device 104 typically enters a specified request to establish video communications with an agent. A banking customer, for example, may be requesting a video conference with a bank agent from an automatic teller machine (ATM). The video communications device 104 sends an initial request over the network 106 to the ACD 102 to establish the video communications. The ACD 102 detects destination information, such as ANI information, contained in the initial request identifying video communications device 104. The ACD 102, however, can only route voice communications and, therefore, rejects the initial request. In response, the video communications device 104 disconnects from the network 106.

The ACD 102 sends the destination information obtained from the initial request to the computer system 112 via the line 118. The computer system 112 then takes the T1 line 116 off hook, thus simulating an incoming call to the ACD 102. In particular, a switch circuit 126 signals to the ACD 102 that video communications are being established, requests that the ACD select one of the agents to receive the video communications and transmits a video request signal to the agent terminal 110 associated with the agent selected by the ACD 102. The switch circuit 126 may indicate to the ACD 102 that the simulated call is to be routed to an agent who can answer video calls (video agent) or the ACD 102 may be programmed to identify any simulated calls received over the dedicated T1 line 116 as video communications.

The agent selection means 122 selects an agent to handle the simulated call using predefined criteria, such as which agents handle video calls, which agents are available and the like. When the agent selection means 122 has selected an agent, the ACD 102 notifies the computer system 112 which agent was selected. The computer system 112 then generates the video request signal and transmits the video request signal to the agent terminal 110 associated with the selected agent. As should be readily understood by those skilled in the art, the video communications system 100 contains a plurality of agent terminals, each of which is associated with an agent. The computer system 112 identifies which agent is associated with which agent terminal in any of a number of well known methods. For instance, each agent may log on with an unique identification number and agent terminal identification number. The computer system 112 thereafter stores the entered identification numbers to match agents and agent terminals. Such methods are well known in the art and will not be further discussed herein.

The video request signal preferably contains the destination information received from the video communications device 104. Using the destination information, the agent terminal 110 establishes video communications with the video communications device 104 over the network 106. Preferably, the agent terminal 110 includes a video card which receives the video request signal and outdials the video communications device 104. Although video cards are well known, the video card currently contemplated for use in the present invention is manufactured by the Intel Corporation in Santa Clara, Calif.

Video communications are consequently established between the agent selected by the ACD 102 and the video communications device 104. The ACD 102 continues to monitor the simulated call received from the computer system 112. The reporting system 124 stores information relating to the video communications established by the computer system 112. Consequently, management and supervisory personnel are able to evaluate the video call activity and, if necessary, make changes for more efficient operation using the extensive reporting capabilities of the ACD 102.

When the video communications are terminated, the computer system 112 senses a release message received from the agent terminal 110. The computer system 112 then notifies the ACD 102 that the video communication is terminated either by placing the T1 line 116 on-hook or by sending an appropriate message over the line 118. The ACD 102 then removes the call from the agent and can thereafter route another call to the agent.

In accordance with the present invention, a method for establishing video communications with a video communications device 104 is provided. The method comprises the steps of receiving at a telephonic switch 102 an initial request that the video communications device 104 wishes to establish video communications; detecting when the telephonic switch 102 receives the initial request; and establishing video communications with the video communications device 104 based on the initial request. Preferably, the initial request is rejected by the telephonic switch 102.

The initial request preferably includes destination information such as automatic number identification (ANI) information, which uniquely identifies the video communications device 104. The method preferably includes the steps of: prompting the telephonic switch 102 to select one of a plurality of agents to receive the video communications and establishing video communications between the video communications device 104 and the selected one of the agents.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A method of controlling a video connection between an agent of an automatic call distributor and a caller, such method comprising the steps of:

detecting an incoming video call from a video communication device of the caller;

detecting an identifier of the caller;

rejecting the video call;

simulating a call to the automatic call distributor;

assigning the agent to the simulated call;

transferring the identifier of the caller to a terminal of the assigned agent; and establishing a video connection between the terminal of the agent and caller based upon the transferred identifier of the caller.

2. The method of controlling a video connection as in claim 1 further comprising transferring the identifier of the caller to a computer associated with the automatic call distributor.

3. The method of controlling a video connection as in claim 2 wherein the step of simulating a call to the automatic call distributor further comprises causing a switch circuit of the computer to go off hook on a call connection between the computer and the automatic call distributor in response to receipt of the transferred identifier of the caller by the computer.

4. The method of controlling a video connection as in claim 3 wherein the step of assigning an agent further comprises transferring an identifier of the assigned agent to the computer over an interconnect between the computer and the automatic call distributor.

5. The method of controlling a video connection as in claim 3 further comprising sensing a release message from the terminal at the conclusion of the video connection.

6. The method of controlling a video connection as in claim 5 wherein the step of sensing a release message further comprises causing the switch circuit of the computer to go on hook.

7. Apparatus for controlling a video connection between an agent of an automatic call distributor and a caller, such apparatus comprising:

means for detecting an incoming video call from a video communication device of the caller requesting a video connection;

means for detecting an identifier of the caller;

means for rejecting the video call;

means for simulating a call to the automatic call distributor;

means for assigning the agent to the simulated call;

means for transferring the identifier of the caller to a terminal of the assigned agent; and means for establishing a video connection between the terminal of the agent and caller based upon the transferred identifier of the caller.

8. The apparatus for controlling a video connection as in claim 7 further comprising means for transferring the identifier of the caller to a computer associated with the automatic call distributor.

9. The apparatus for controlling a video connection as in claim 7 wherein the means for simulating a call to the automatic call distributor further comprises means for causing a switch circuit of the computer to go off hook on a call connection between the computer and the automatic call distributor in response to receipt of the transferred identifier of the caller by the computer.

10. The apparatus for controlling a video connection as in claim 9 wherein the means for assigning an agent further comprises means for transferring an identifier of the assigned agent to the computer over an interconnect between the computer and the automatic call distributor.

11. The apparatus for controlling a video connection as in claim 10 further comprising means for sensing a release message from the terminal at the conclusion of the video connection.

12. The apparatus for controlling a video connection as in claim 11 wherein the means for sensing a release message further comprises causing the switch circuit of the computer to go on hook.

13. Apparatus for controlling a video connection between an agent of an automatic call distributor and a caller, such apparatus comprising:

an automatic call distributor adapted to detect an incoming video call from a video communications device of the caller requesting a video connection, to receive an identifier of the caller and then to reject the video call;

a switch circuit within a computer of the automatic call distributor adapted to simulate a call to the automatic call distributor;

an agent selection system within the automatic call distributor adapted to assign the agent to the simulated call;

the computer adapted to transfer the identifier of the caller to a terminal of the assigned agent; and a video card within the terminal of the assigned agent adapted to establish a video connection between the terminal of the agent and caller based upon the transferred identifier of the caller.

14. A method of establishing a video connection between an agent of an automatic call distributor and a caller, such method comprising the steps of:

receiving an initial video call from a video communications device of the caller requesting a video connection;

detecting an identifier of the caller;

terminating the video call;

transferring the identifier of the caller to a computer associated with the automatic call distributor;

simulating a call to the automatic call distributor from the computer;

receiving from the automatic call distributor by the computer an identifier of an agent assigned to the simulated call in response to the simulated call;

transferring the identifier of the caller to the assigned agent; and establishing a video connection between the agent and caller based upon the transferred identifier.

* * * * *